Jan. 7, 1941.  M. F. JOY ET AL  2,227,781
ELECTRICALLY HEATED GARMENT
Filed Dec. 2, 1938  3 Sheets-Sheet 1
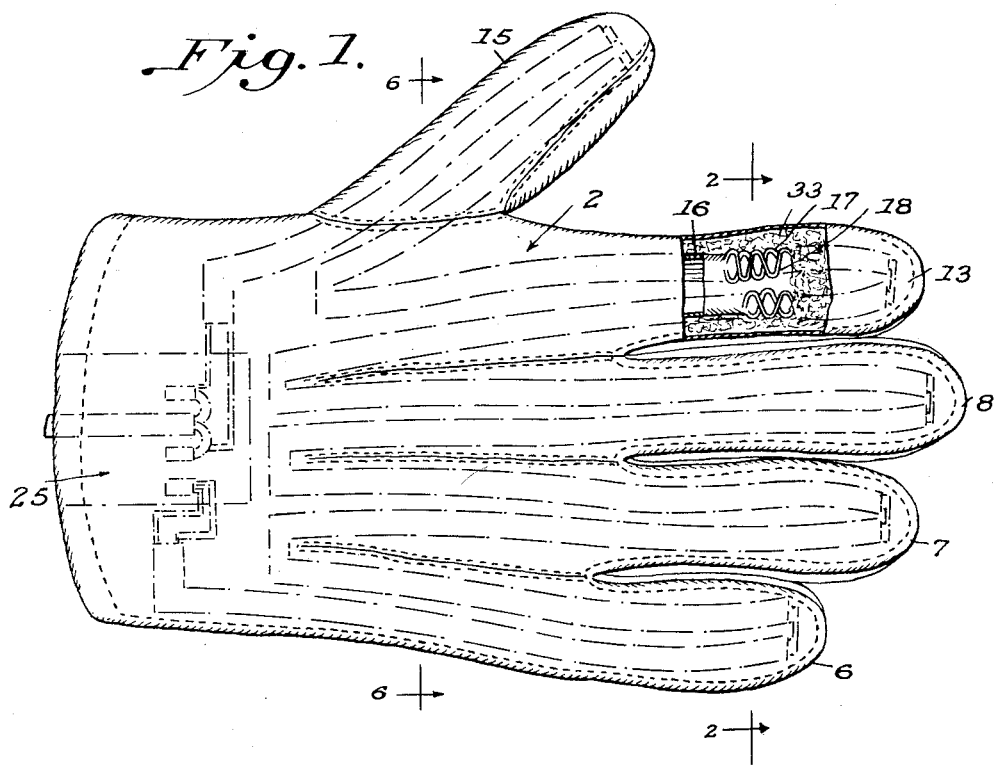
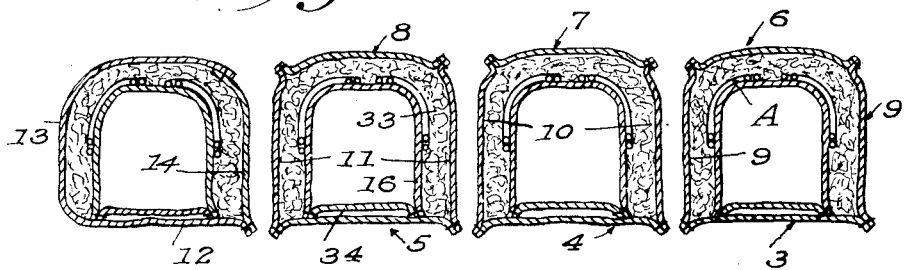
Inventors
MILTON F. JOY and
ERNEST E. SHEPARDSON
By Milans & Milans
Attorneys

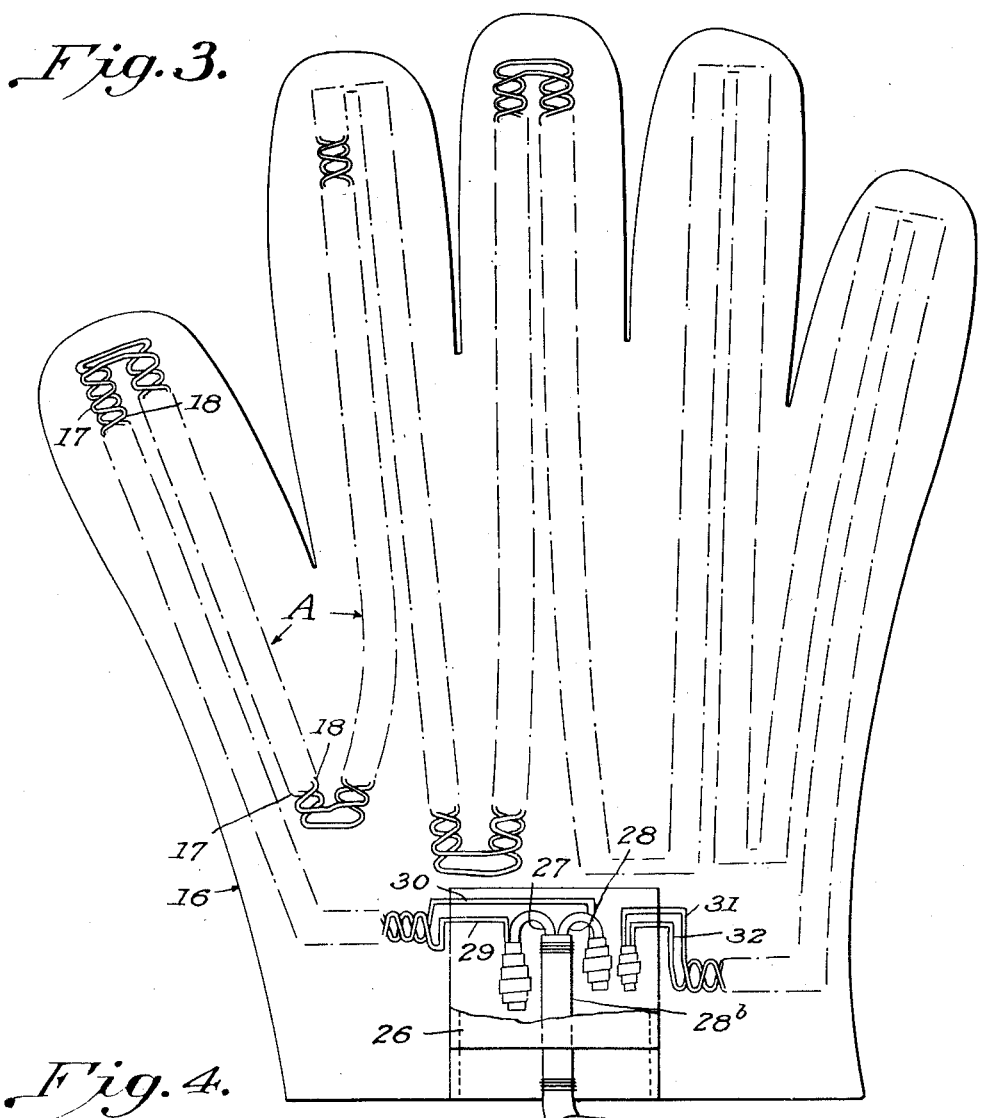
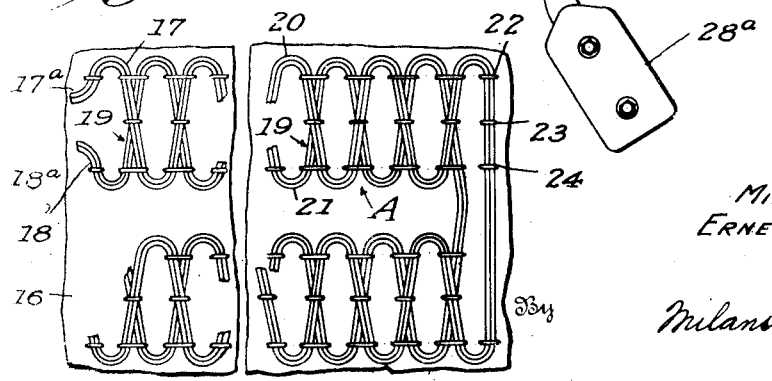

Inventors
MILTON F. JOY and
ERNEST E. SHEPARDSON

By Milans & Milans
Attorneys

Patented Jan. 7, 1941

2,227,781

UNITED STATES PATENT OFFICE 2,227,781

ELECTRICALLY HEATED GARMENT

Milton F. Joy, Green Island, N. Y., and Ernest E. Shepardson, East Providence, R. I., assignors to Colvinex Corporation, New York, N. Y., a corporation of New York Application December 2, 1938, Serial No. 243,672

1 Claim. (Cl. 219—46)

This invention relates to improvements in electrically heated garments, especially gloves for aviators and others working at low temperatures.

An object of the invention is to provide an improved electric heating unit for garments, so formed and applied as to supply the desired heat and distribute the same as evenly as possible and which will at the same time be capable of readily accommodating itself to bending and stretching of portions of the garment in use so that it is not liable to break and does not detract from the flexibility of the garment.

Another and more particular object of the invention is to provide an improved electrically heated glove equipped with an improved heating unit of the character referred to, that will supply the desired heat over selected areas and will allow entire freedom of movement of the hand.

A further object of the invention is to provide an improved electrically heated glove in which the heating unit will be well protected against abrasion and that will be durable, safe, and satisfactory in use.

A still further object of the invention is to guard against heat loss through radiation or convection of heat from the heating unit into the atmosphere, and so conserve as much as possible of the heat supplied to the hand and reduce the required current consumption to a minimum.

The invention, with other objects and advantages thereof, and the particular construction, combination, and arrangement of parts comprising the same will be understood from the hereinafter contained detailed description when considered in connection with the accompanying drawings forming a part hereof and illustrating one embodiment of the invention.

In the drawings,

Figure 1 is a back plan view partly in section of a glove equipped with electric heating means in accordance with the present invention;

Figure 2 is a transverse section on an enlarged scale on the line 2—2 of Figure 1;

Figure 3 shows diagrammatically on an enlarged scale a heating unit constructed in accordance with the present invention attached to a flexible carrier and lining member;

Figure 4 is a plan view on an enlarged scale of a section of the heating unit illustrated in Figure 3;

Figure 5:
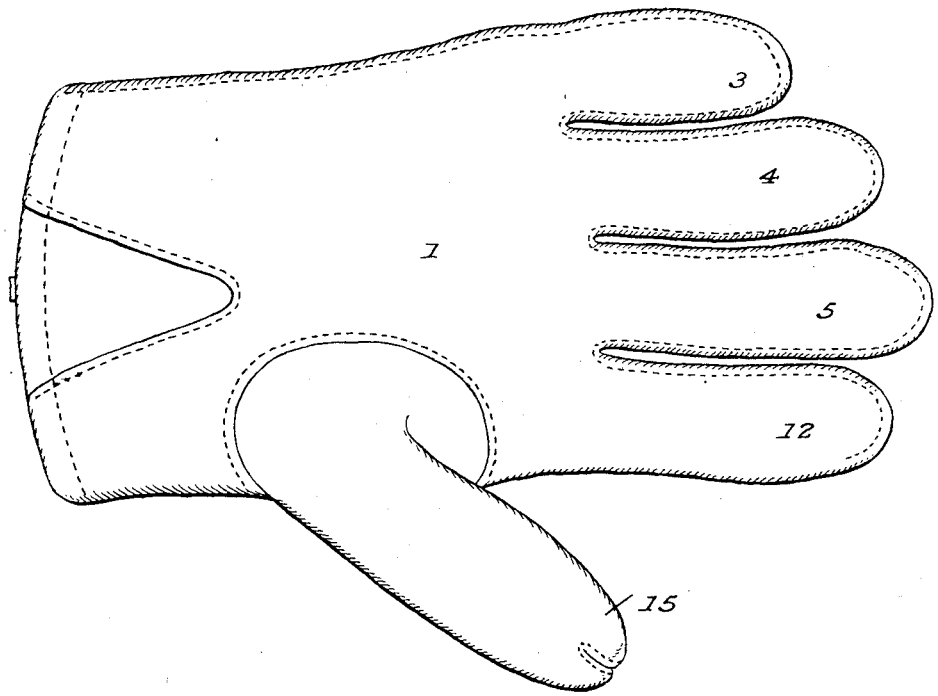
Figure 5 is a plan view of the front of the glove.
Figure 6:
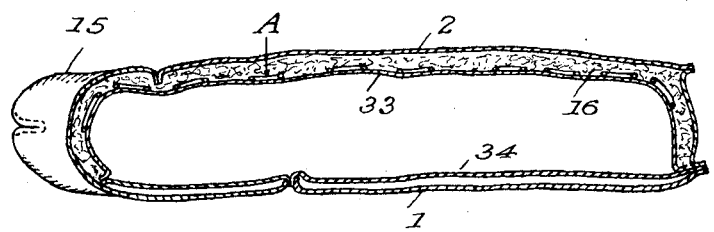
Figure 6 is a transverse section on the line 6—6 of Figure 1.

While a preferred embodiment of the invention is illustrated in the drawings, it will of course be understood that minor changes and modifications may be made in the particular construction shown, and the invention may be embodied in other forms as will appeal to those skilled in the art and falling within the scope of the appended claim, without departing from the spirit of the invention.

Referring to a detailed description of the particular embodiment of the invention illustrated in the drawings, the construction of glove shown comprises a front 1 and back 2 having portions 3, 4, 5, and 6, 7, 8 forming, respectively, the fronts and backs of the small and middle fingers, the sides of these fingers being formed by portions 9, 10, 11. The front 1 has a portion 12 forming the front of the index finger, and which portion 12 has a side extension 13 forming one side and the back of this finger, the finger being completed by a piece 14. The thumb 15, as shown, is of the round inserted type. The glove is made of leather or any other suitable material to resist wear and moisture.

In the interior of the glove is a fabric lining 16 suitably secured thereto as by stitching and arranged to surround the sides and backs of the fingers and extend over the back of the hand. Attached to the lining 16 at the back thereof is an electric heating unit made up of a pair of conductor members 17 and 18, each bent back and forth to form a longitudinal series of transverse tapering loops 19, and the looped members being reversely arranged in overlapping relation, as shown in Figure 4 of the drawings, to form a strip-like structure designated A, with the end bend portions 20 of one conductor member disposed between end bend portions 21 of the other, and with the straight side portions of the loops crossing each other.

The conductor strip A is laid on the lining 16, as illustrated in Figure 3, so that when the lining with the heating unit mounted thereon is incorporated with the glove structure the conductor strip A will extend outwardly from one side of the back of the hand at the base thereof adjacent the thumb, along the back and one side of the thumb, thence across the end at the back thereof and inwardly along the back and other side of the back of the thumb and along the back of the hand. It then, as shown, is similarly carried back-and-forth over the back of the hand and along the backs and sides of the other fingers, in succession. As shown in Figure 2 of the drawings, the strip A extends well along the sides of the fingers, those sections of the conductor strip that extend along the fingers being curved transversely, as shown, to follow the cross-sectional contour of the fingers, when the conductor strip with the lining 16 is assembled in the glove structure. The conductor strip A is anchored to the lining 16 by stitching, three parallel rows of stitching 22, 23, 24 being shown, one extending centrally of the conductor strip and one at either side thereof near the end bend portions of the loops. The end portions of the conductor strip A continue over the back of the hand to the wrist portion 25, terminating in a pocket 26 that is securely attached to the lining 16, the pocket serving as a container structure for terminal connections of the heating unit with lead wires 27, 28 of a short flexible cord having a terminal connecting plug 28ᵃ adapted to be connected with a source of electric energy.

The lead wires 27 and 28 which extend into the pocket 26 from the lower end thereof are enclosed in a flexible insulating sleeve 28ᵇ and securely fastened by stitching to a wall of the pocket 26 and to the lining 16. The end portions 29 and 30 of the conductor members 17 and 18 are connected, respectively, to the lead wires 27 and 28 of the terminal cord, and the opposite end portions 31 and 32 are suitably connected to each other, as shown. The conductor members 17 and 18 constituting the conductor strip A each consists of a plurality of thin, easily flexible, insulated wires 17ᵃ, 18ᵃ. In the particular exemplification of the invention illustrated in the drawings, the conductor members 17, 18 each comprises two of such insulated conductors composed of No. 38 metal core yarn; but, as will be understood in practicing the invention, the size and number of the component wires will vary, depending upon the voltage available and the heat desired. The insulated wires 17ᵃ, 18ᵃ are formed by threads of the construction disclosed in Patent No. 1,965,542 issued to William Colvin, Jr., July 3, 1934, composed partially of wire and partially of textile fibers, but which are endowed with characteristics of softness, flexibility, and resistance to kinking, fairly comparable to like threads composed entirely of textile fiber, the metal wire core of the composite thread constituting the conducting wire of the heating unit, and the textile fiber wrappings of the composite thread forming the insulation for the conducting wire.

The particular construction of heating unit with the special form of looped conductor members reversely arranged in overlapping relation, as hereinbefore set forth, provides for considerable heating structure within relatively restricted areas and for the advantageous distribution of the heat. At the same time, the construction and arrangement is such that it will not offer any appreciable resistance to movements of the hand or fingers and it is not liable to be broken by stretching of portions of the glove under manipulation by the hand or fingers in the use thereof. This stretching will not result in any tensile stress on the conductor wires, as the movement will be compensated for or taken up by very small bending stresses of the numerous loops of the heating unit.

Interposed between the heating unit and the back of the glove and the backs and sides of the fingers thereof is a layer 33 of woollen fabric or other material having similar cushioning, bending, and heat-insulating qualities. This layer of woollen fabric extends completely over the heating unit and serves two purposes. First, it provides efficient protection for the conductor elements of the heating unit against injury by abrasion; and in this respect is important in providing a durable, satisfactory construction. Second, it serves as insulating means to prevent loss of heat by radiation or convection into the atmosphere.

34 designates an inner lining for the front of the glove. This lining, which is secured by stitching to marginal portions of the lining 16, is preferably made of woollen fabric of thin quality, so as not to interfere with the sense of touch when gripping or contacting objects. For the same reason, the palm side of the glove is left entirely free from heating elements.

By the particular construction and arrangement of parts hereinbefore set forth, a durable, safe, satisfactory construction is provided. The heating unit is of an efficient nature, providing for supplying the desired heat advantageously distributed. It is not liable to break due to stretching of the glove, is well protected against injury by abrasion, and can be easily produced and applied to the inner lining. The loops of the conductor members can be formed and fastened by stitching to the lining, in one operation.

We claim:

As a new article of manufacture, an electrically heated glove comprising palm, back, and finger portions, the fingers having flexible front portions and inner fabric back portions adapted to relatively closely fit the fingers, and the back having a corresponding inner fabric portion adapted to immediately overlie the back of the hand, combined with flexible outer portions for the said back and backs of the fingers spaced substantially away from said inner fabric portions of the back and fingers to provide receiving chambers therebetween, fine highly flexible electrical heating wire fabric within said chambers on the bottoms thereof to immediately overlie the fabric portions of the fingers and back, and a soft flexible filling in said chambers of substantial thickness overlying the heating wire fabric to afford insulation to prevent radiation of heat externally of the back of the glove, and to cushion and protect the wire fabric therebelow against abrasion or fracture.

MILTON F. JOY.
ERNEST E. SHEPARDSON.